US005338504A

United States Patent [19]

Wang et al.

[11] Patent Number: 5,338,504

[45] Date of Patent: Aug. 16, 1994

[54] DECORATIVE SURFACE COVERINGS HAVING PLATEY MATERIAL

[75] Inventors: C. David Wang, Wilmington, Del.; Jeffrey R. Shultz, Salem, N.J.; Hao A. Chen, Glen Mills, Pa.

[73] Assignee: Mannington Mills, Inc., Salem, N.J.

[21] Appl. No.: 178,596

[22] Filed: Apr. 7, 1988

Related U.S. Application Data

[62] Division of Ser. No. 873,379, Jun. 12, 1986, Pat. No. 4,756,951.

[51] Int. Cl.$^5$ ............ B29C 43/00

[52] U.S. Cl. ............ 264/555; 264/108; 264/500

[58] Field of Search ............ 264/108, 500, 555

[56] References Cited

U.S. PATENT DOCUMENTS

| | | | |
|---|---|---|---|
| 2,775,994 | 1/1957 | Rowe | 264/76 |
| 3,230,284 | 1/1966 | Iverson et al. | 264/245 |
| 3,341,396 | 9/1967 | Iverson | 264/73 |
| 4,025,665 | 5/1977 | Hannon | 427/192 |
| 4,058,580 | 11/1977 | Flanders | 264/113 |
| 4,090,773 | 5/1978 | Bauer et al. | 428/324 |
| 4,217,320 | 8/1980 | Ezis et al. | 264/221 |
| 4,409,280 | 10/1983 | Wiley et al. | 428/908.8 |
| 4,617,191 | 10/1986 | Nowak | 264/117 |

*Primary Examiner*—Allan R. Kuhns
*Attorney, Agent, or Firm*—Finnegan, Henderson, Farabow, Garrett & Dunner

[57] ABSTRACT

A decorative surface covering and a method of and an apparatus for making the decorative surface covering. The decorative surface covering has a transparent or translucent layer. The transparent or translucent layer contains a platey material oriented at two or more different angles with respect to the surface of the layer to provide an enhanced three dimensional effect to the decorative surface covering.

13 Claims, 3 Drawing Sheets

FIG. 1
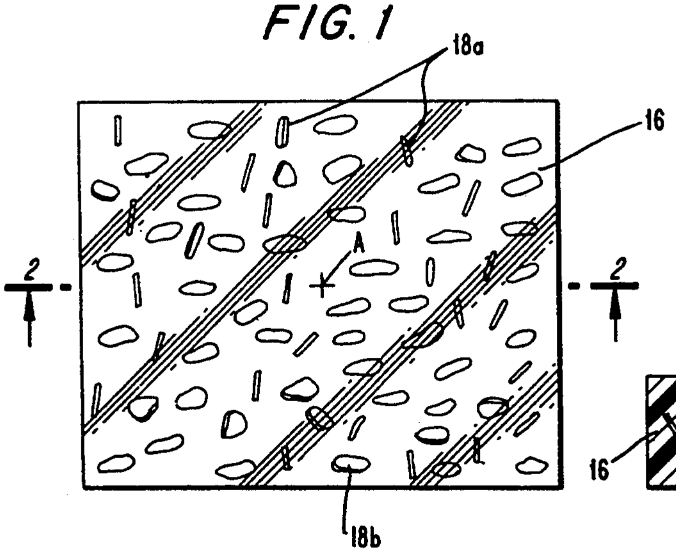
FIG. 2
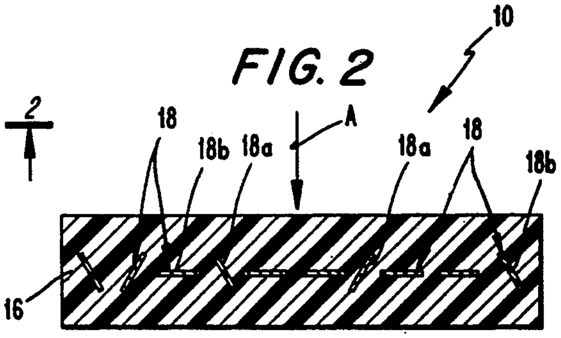
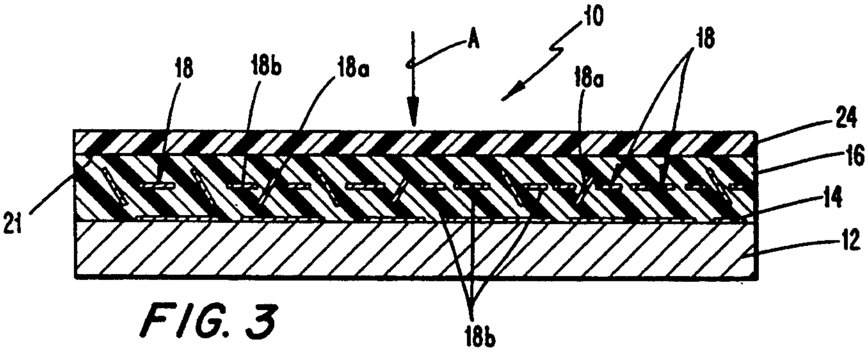
FIG. 3
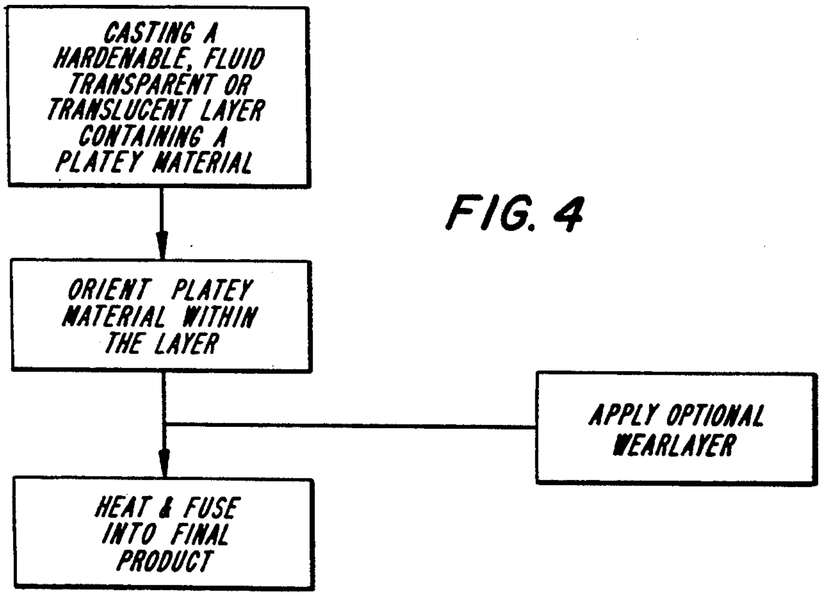
FIG. 4

DECORATIVE SURFACE COVERINGS HAVING PLATEY MATERIAL

CROSS-REFERENCE TO RELATED APPLICATION

This application is a division of application Ser. No. 06/873,379, filed Jun. 12, 1986, now U.S. Pat. No. 4,756,951, the entire disclosure of which is incorporated by reference herein.

BACKGROUND OF THE INVENTION

This invention relates to decorative surface coverings and, more particularly, to decorative surface coverings having platey material oriented at two or more different angles with respect to the surface.

Decorative surface coverings have a wide range of uses such as surface coverings for use as a floor, a wall, or a ceiling, a desk, a table, or a counter top; surface layers on leather, fabrics, paper, wood, metals, and glass; upholstery, drapery, and clothing materials; interiors for cars, trucks, boats, airplanes, and other means of transportation; covers for books and other publication and like articles. These decorative surface coverings typically contain a platey material in one or more layers of the surface covering.

When these platey materials are contained in one or more transparent or translucent layers within the surface covering, the platey material is visible. A person viewing the decorative surface covering sees a lustreous pearlescent appearance, because the flat or platey side of the platey material is oriented mainly parallel to the horizontal surface of the decorative covering so as to be perpendicular to the angle of view. The platey material has a length and width that exceeds its thickness and is reflective to light.

Generally, manufacturers of decorative surface coverings attempt to maintain the flat or platey side of the platey material, such as a pearlescent pigment, substantially parallel to the horizontal surface of the decorative surface covering to obtain a decorative surface covering in which as much of the platey material as possible is in such a substantial parallel alignment. These manufacturers desire such a parallel alignment because they wish to produce a uniform or smooth, optimally pearlescent effect in the resulting decorative surface covering by having the flat or platey side of the platey material presented perpendicular to the angle of view. Consequently, one viewing the decorative surface covering would see the flat or platey side of the platey material in a parallel alignment.

Indeed, previous techniques of manufacturing decorative surface coverings prefer not to disturb the platey material, such as the pearlescent pigment-containing layer, during manufacture because a uniform or smooth visual effect was desired. Previously, the art believed that by disturbing the parallel alignment of the platey material, undesirable diffractions are obtained in the decorative surface covering so as to detract from or destroy the normally desired sheen of the decorative surface covering.

However, decorative surface coverings having platey material, such as pearlescent pigments, in a parallel alignment do not impart to the decorative surface covering the desired appearance of an enhanced three dimensional effect. Such a three dimensional effect is extremely pleasing in a decorative surface covering because it provides an overall appearance of depth and beauty to the decorative surface covering.

Especially, when the decorative surface covering is produced to simulate a marble or other natural type design, the lack of such an enhanced three dimensional effect in the decorative surface covering hinders the ability of the decorative surface covering to simulate these designs. Consequently, the insistence in the art of maintaining the platey material, such as pearlescent pigments, in a parallel alignment relative to the horizontal surface of the decorative surface covering significantly detracts from and thwarts the formation of an enhanced three dimensional effect in the decorative surface covering.

SUMMARY OF THE INVENTION

The inventors of the present invention have developed a unique decorative surface covering that overcomes the significant and inherent disadvantages present in previous decorative surface coverings. Unlike previous decorative surface coverings, the decorative surface covering of the present invention exhibits a highly desirable and attractive enhanced three dimensional effect. Consequently, the decorative surface covering of the present invention presents an enhanced three dimensional effect that permits a rendering of natural type formations, such as, but not limited to marble or granite.

The present invention achieves these various advantages by providing a decorative surface covering, a method of forming the decorative surface covering, and an apparatus to form the decorative surface covering. The decorative surface covering of the present invention comprises: (a) a transparent or translucent layer; and (b) platey material distributed throughout the layer. The platey material is substantially oriented at two or more different angles with respect to the surface of the layer to provide an enhanced three dimensional effect to the decorative surface covering.

The method of forming a decorative surface covering of the present invention comprises the steps of: (a) casting a hardenable fluid transparent or translucent layer containing a platey material, and (b) reorienting the platey material within the transparent or translucent layer at two or more different angles with respect to the surface of the layer to provide an enhanced three dimensional effect to the decorative surface covering.

The present invention also provides an apparatus for forming a decorative surface covering having an enhanced three dimensional effect. The apparatus comprises: (a) a means for casting a hardenable fluid transparent or translucent layer containing a platey material; and (b) a means to reorient the platey material to form a distributed pattern of platey material within the fluid transparent or translucent layer. The platey material is reoriented at two or more different angles with respect to the surface of the layer to provide an enhanced three dimensional effect.

The present invention overcomes the numerous inherent disadvantages commonly associated with previous decorative surface coverings and their associated processes and obtains the various advantages of the invention. By reorienting the platey material in the transparent or translucent layer at two or more different angles with respect to the surface of the layer, the decorative surface covering of the present invention provides a highly desirable, enhanced three dimensional effect to the decorative surface covering.

Preferably, the platey material is nacreous pearlescent pigments that have their platey sides reoriented relatively parallel to the horizontal surface of the translucent or transparent layer to exhibit a lustreous pearlescent appearance. In such an embodiment, the pearlescent pigments reoriented at an angle substantially vertical to the surface have a significantly reduced pearlescent appearance and, hence, create an enhanced three-dimensional effect through swirls and streaking lines that enhance the marble-like appearance of the decorative surface covering.

Consequently, the present invention significantly advances over the state of the art. The decorative surface coverings of the present invention exhibit not only a pearlescent lustreous effect, but also possess an enhanced three-dimensional appearance that allows the decorative surface covering to simulate marble or other natural type designs.

The foregoing and other features and advantages of the present invention will be made more apparent from the following description of the preferred embodiments.

BRIEF DESCRIPTION OF THE DRAWINGS

The accompanying drawings not drawn to scale are incorporated in and constitute a part of the specification, illustrate various embodiments of the invention and, together with the following description, serve to explain the principles of the invention.

FIG. 1 is a top view of a decorative surface covering of the present invention.

FIG. 2 is a fragmentary cross-sectional view of the decorative surface covering of FIG. 1 taken along line 2—2.

FIGS. 3 and 9 are fragmentary cross-sectional views of alternative embodiments of the decorative surface covering of the present invention.

Both FIG. 2 and 3 show only a monolayer of platey material within a transparent or translucent layer. The invention contemplates multiple layers of platey material.

FIG. 4 is a flow diagram illustrating a process of the present invention.

DESCRIPTION OF THE PREFERRED EMBODIMENT

Figure 5:
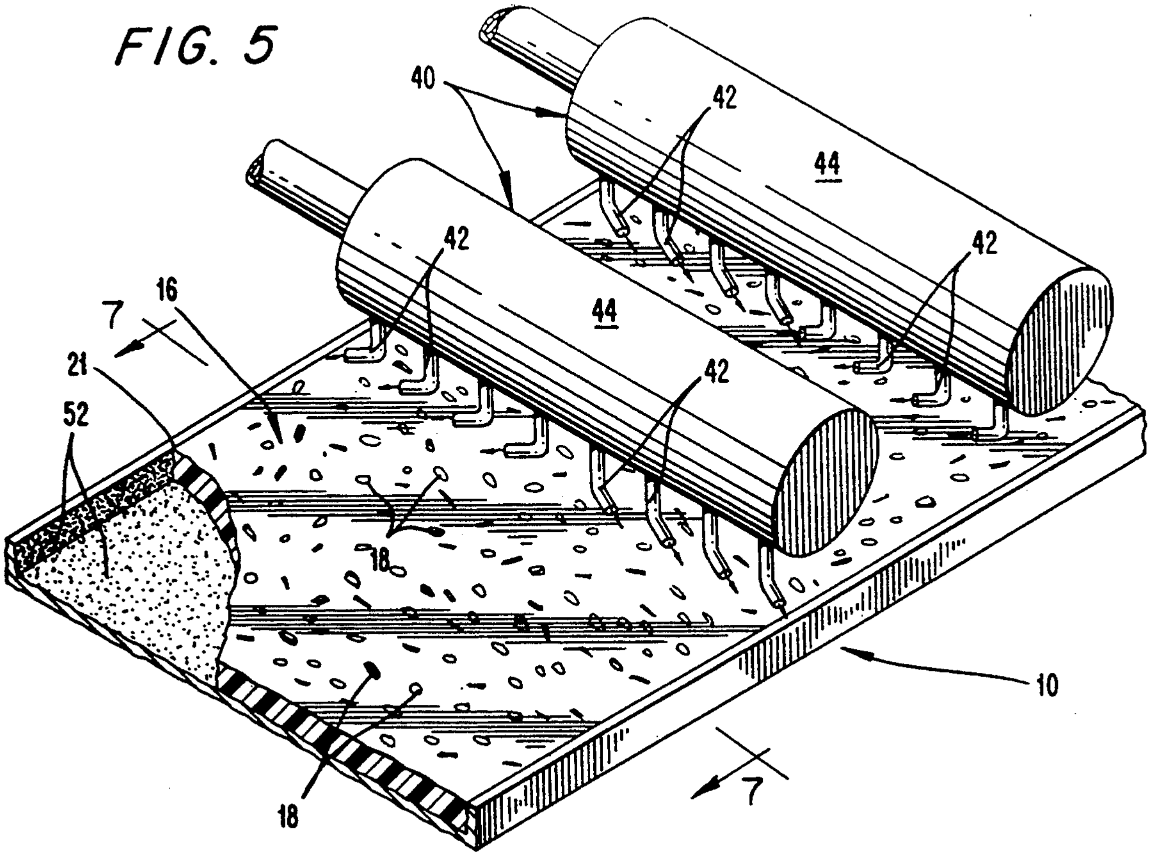
FIG. 5 is a perspective view of an apparatus of the present invention.

The present invention provides a decorative surface covering. The decorative surface covering has a transparent or a translucent layer. A platey material is distributed throughout the layer. The platey material is reoriented at two or more different angles with respect to the surface of the transparent or translucent layer to provide an enhanced three dimensional effect to the decorative surface covering.

In accordance with the present invention, the decorative surface covering has a transparent or translucent layer. As shown in FIGS. 1 and 2, a decorative surface covering 10 has a translucent or transparent layer 16.

The transparent or translucent layer 16 can be made from various transparent or translucent materials known in the art, such as plastisol. Preferably, the transparent layer 16 is a polyvinyl chloride (PVC) plastisol composition, which is a dispersion of finely divided resin in a plasticizer. A typical plastisol composition is 100 parts resin and 50 parts plasticizer that form a paste that gels when heated sufficiency as a result of the solvation of the resin particles by the plasticizer.

The resin used in the PVC plastisol is typically a synthetic resin, such as a polymer or copolymer of vinyl chloride. Various additives known in the art can be added to the PVC plastisol, such as, but not limited to, light and heat stabilizers, UV absorbers, and/or solvents. Preferably, the transparent or translucent layer is between about 0.5 mils to about 1,000 mils in thickness and, preferably, is in the range of about 10 mils to about 30 mils.

As shown in FIG. 3, in one embodiment, the decorative surface covering 10 can also have a substrate 12 underlying the transparent or translucent layer 16. A design 14 can also be printed on the substrate 12. Various substrates known in the art can be used, such as release paper, paper, foil, wood, metal, fabric, and/or, for example, a fibrous sheet material. The fibrous sheet materials include fibers, such as cellulose, asbestos, fiberglass, polypropylene, polyethylene, polyester, etc. and combinations thereof.

The substrate 12 can also include a foamable resinous layer selected from those known in the art. The resinous composition can include a synthetic resin, such as a polymer or a copolymer of vinyl chloride. The resinous composition can also include various blowing or foaming agents, accelerators, catalysts, stabilizers to reduce the harmful effects of degradation due to light and heat, primary and secondary plasticizers, pigments, fillers, and other conventional and well-known additives. The foamable resinous containing substrate 12 is formed by various techniques known in the art, such as reverse roll coating, knife coating, air knife coating, and flexible blade coating. The substrate 12 preferably has a thickness in the range of about 0.5 mils to about 1,000 mils and, preferably, in the range of about 10 mils to about 50 mils.

The design 14 can be printed on the substrate 12 by various techniques known in the art. The appropriate technique and composition for the design are selected to achieve the desired design and color on the substrate 12. Examples of such printing techniques include direct or indirect rotogravure printing, offset printing, flexographics, or screen printing. Appropriate printing ink compositions include, but are not limited to, polymers and copolymers of vinyl chloride, acrylic, and mixtures thereof. The printing ink composition can contain various additives known in the art, such as foaming agents, foaming agent modifiers, and inhibitors.

While not expressly shown, as will be obvious to one skilled in the art, a similar design can be imprinted upon the upper and/or lower surfaces of the transparent or translucent layer containing the platey material. Additionally, this invention contemplates a decorative surface covering that includes a plurality of transparent or translucent layers containing a platey material and/or a plurality of other transparent or translucent layers wherein a printing design can be printed upon some or all of such layers.

In accordance with the present invention, platey material is distributed throughout the translucent or transparent layer. The platey material is substantially oriented at two or more different angles with respect to the surface of the layer to provide an enhanced three dimensional effect to the decorative surface covering. As illustrated in FIGS. 1-3, the transparent or translucent layer 16 contains platey material 18 distributed throughout the layer 16. The platey material 18 is substantially oriented at two or more different angles with respect to the surface 21 of the layer 16, as shown in FIGS. 1-3.

As used herein, the term "platey material" indicates a material having a length and width that is larger than the thickness of the material with the material being substantially reflective to light. The platey material appears flake-like or platelet-like. The platey material can be those conventionally used in the art. Acceptable platey material can include thermoplastic, metallic and inorganic filler materials, such as polyester flakes, mica, nacreous pearlescent pigments, and aluminum flakes. Examples of suitable platey material are provided in Woodhams et al., High Aspect Ratio Mica and Other Flake Reinforcement, Handbook of Fillers and Reinforcements for Plastics (edited by Harry S. Katz and John V. Milewski) 333-70. The pearlescent pigments are about 0.1% to about 20% by weight of the transparent or translucent layer and, preferably, are about 0.5% to about 5% by weight.

Typically, as shown in FIGS. 1-3 and 7, a first portion of the platey material 18, such as pearlescent pigments 18*a*, are positioned substantially vertical to the surface 21 of the transparent or translucent layer. A second portion of platey material 18, such as pearlescent pigments 18*b*, are positioned substantially horizontal to the surface 21. As a result, the transparent or translucent layer 16 contains platey material at varying angles with respect to the surface 21 so that the light passing into the transparent or translucent layer 16 reflects at two or more angles off from the platey material.

The platey material 18 that is oriented within the transparent or translucent layer 16 provides an enhanced three dimensional effect to the decorative surface covering because some of the platey material, such as the substantially vertical platey material 18*a*, lie substantially vertical with respect to the horizontal surface 21 of the transparent or translucent layer 16, while other platey material, such as platey material 18*b*, lie substantially horizontal to the horizontal surface 21. As a result, these different angles at which the platey material 18*a* and 18*b* are reoriented within the transparent layer 16 reflect and diffract light at various angles as the light passes within the transparent or translucent layer 16. Consequently, one viewing the decorative surface covering, such as from angle A in FIGS. 2 and 3, perceives the platey material to be at various angles within the transparent or translucent layer 16. Hence, an enhanced three dimensional effect is created.

In one embodiment, when the platey material is nacreous pearlescent pigments, the pearlescent pigments 18*b* that are substantially horizontal to the horizontal layer 21 of the transparent or translucent layer 16 produces an enhanced lustreous pearlescent appearance. In contrast, the pearlescent pigments 18*a* that are substantially vertical with respect to the horizontal layer 21 possess a reduced pearlescent appearance. Consequently, the varying angles of the platey material 18 creates differing lustre to give the appearance of a swirling or streaking effect within the transparent or translucent layer 16.

The orientation of the platey material can be either uniformly or randomly distributed in the transparent or translucent layer. Likewise, the platey material can be either continuously or intermittently distributed in the transparent or translucent layer.

Figure 8:
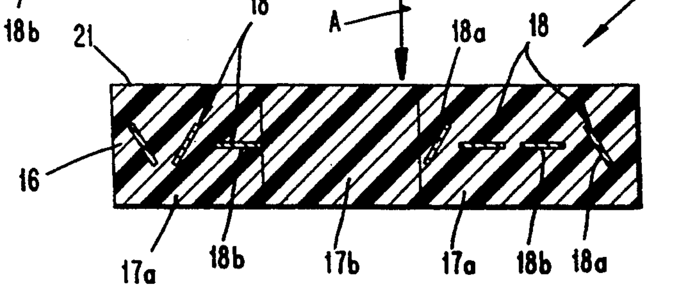
FIG. 8 is a cross-sectional view of a decorative surface covering embodiment according to the present invention that shows an intermittently displaced platey material within the transparent or translucent layer.

In one embodiment of the present invention, the platey material can be intermittently distributed in the transparent or translucent layer. As shown in FIG. 8, the transparent or translucent layer 16 can be composed of segments 17 some of which, such as segment 17*a*, have platey material 18 distributed within the transparent or translucent layer 16 and some of which, such as segments 17*b*, do not contain platey material 18. This intermittent distribution can be achieved by a number of methods. For example, the segment 17*a* containing platey material 18 can be selectively deposited on a substrate and then the platey material 18 can be reoriented within the transparent or translucent layer 16. After this reorientation, the segment 17*b* containing no platey material is deposited on the substrate. Alternatively, segments 17*a* containing the platey material 18 and segments 17*b* lacking platey material can be selectively deposited on the substrate. The platey material 18 in segments 17*a* are then reoriented so that the platey material forms two or more different angles with respect to the surface of the layer to provide an enhanced three dimensional effect.

The platey material 18 distributed within the transparent or translucent layer 16 typically have lengths in the range of about 5 microns to about 50 microns, widths in the range of about 5 microns to about 50 microns, and thicknesses in the range of about 0.06 microns to about 0.09 microns. The platey material is preferably 0.1% to about 20% by weight of the transparent or translucent layer.

The decorative surface covering 10 can also have a transparent wearlayer or protective layer overlying the transparent or translucent layer containing the platey material. For example, as shown in FIG. 3, a transparent or translucent wearlayer 24 overlies the transparent or translucent layer 16. The wearlayer 24 can be made from various transparent or translucent compositions known in the art, such as a PVC plastisol composition. The wearlayer or protective layer typically has a thickness in the range of about 0.5 mils to about 1000 mils and, preferably, in the range of about 5 mils to about 30 mils.

The decorative surface covering 10 is then set by various techniques known in the art, such as heat fusion. For example, in heat fusion, various temperatures and times known within the art, such as a temperature of about 300° F. to about 450° F. and a dwell time of about 2 min. to 5 min., can be used to fuse together the decorative surface covering 10. Of course, the time and temperature depend, in part, upon the composition of the various layers of the decorative surface covering 10.

The decorative surface covering 10 of the present invention can be embossed by various techniques known in the art, such as mechanical and chemical embossing, to achieve various desired decorative effects within the decorative surface covering 10. The resulting decorative surface covering has a variety of uses. For example, it can be used as a decorative surface covering for a floor, wall, or ceiling, as well as a desk, table, or counter top. The decorative covering can be readily applied to these surfaces by various techniques well known in the art.

Figure 9:
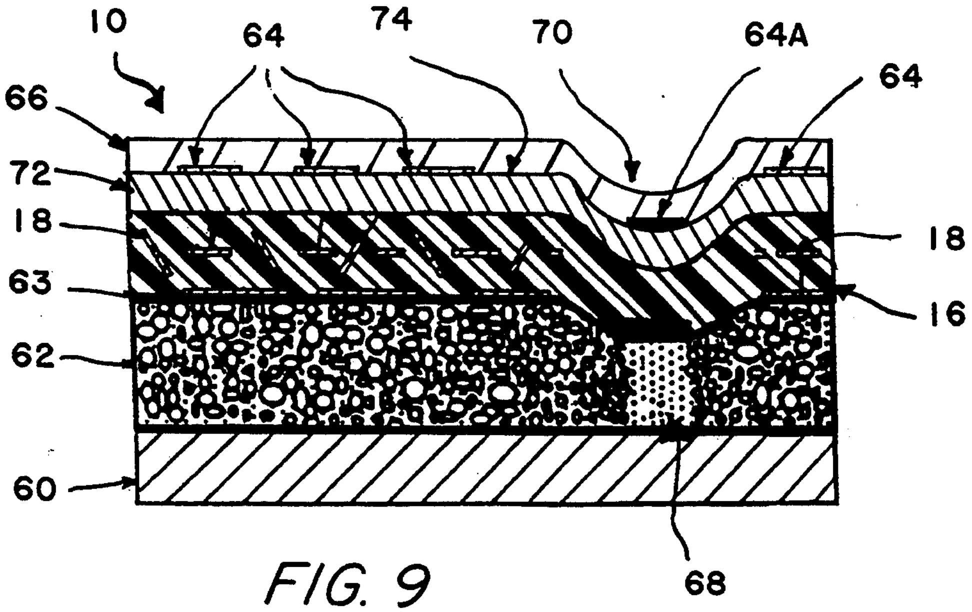

Referring to FIG. 9, the decorative surface covering 10 of the invention is comprised of a substrate 60 and a foamed layer 62 derived from a foamable resinous layer containing a foaming agent. A transparent or translucent first layer 16 containing displaced platey material 18 that is substantially reoriented at two or more different angles with respect to surface 63 of the first layer 16 overlies the foamed layer 62. A transparent or translucent second layer 66 overlies the first layer 16. Another transparent or translucent layer 72 is interposed between the first layer 16 containing the platey material and the layer 66. Layer 72 has a surface 74 on which a printing design 64, 64A is applied. The portion 64A of the design contains a foaming agent modifier or inhibitor that retards or otherwise controls foaming of foamed layer 62 during the manufacturing process.

The present invention also provides a method of forming a decorative surface covering. In accordance with the method, a hardenable fluid transparent or translucent layer containing a platey material is cast. As discussed above and depicted in FIGS. 1-4 and 9, the transparent or translucent layer 16 contains platey material 18. In one embodiment, the orientation of the platey material, such as nacreous pearlescent pigments, is uniformly distributed within the transparent or translucent layer. In another embodiment, the orientation of the platey material is nonuniformly distributed within the transparent or translucent layer. Likewise, the platey material can also be randomly or intermittently distributed within the transparent or translucent layer.

Various techniques known in the art, as discussed above, can be used to cast and set the fluid transparent or translucent layer 16. Various techniques and apparatus also known in the art can be used to distribute the platey material within the transparent or translucent layer 16.

In accordance with the method, the platey material is reoriented within the transparent or translucent layer at two or more different angles with respect to the surface of the layer to provide an enhanced three dimensional effect to the decorative surface covering. A first portion of the platey material is preferably oriented substantially vertical to the surface of the layer and a second portion of the platey material is preferably oriented substantially horizontal to the surface of the layer. Various techniques, as discussed below, can be used to create such an orientation among the platey material, such as nacreous pearlescent pigments.

In one embodiment of the present invention, the platey material is reoriented by positionally directing onto the transparent or translucent layer a plurality of jet streams. As a result, the normally horizontal platey material is sufficiently disturbed so that at least a portion of the platey material is reoriented to lie at various angles with respect to the surface of the layer. Preferably, the jet streams, such as air or gaseous streams, are from a plurality of nozzles, some or all of which are pulsating and which may be controlled or programmed by various computer control devices and/or programs known in the art. The nozzles can be adapted to oscillate back and forth across the transparent or translucent layers.

In another embodiment of the method of the present invention, the platey material is reoriented within the transparent or translucent layer by applying a surfactant, such as a silicone surfactant, to the transparent or translucent layer containing the platey material in an amount effective to reduce the surface tension of the liquid transparent or translucent layer. Suitable silicone surfacants include silicone oil and silicone polymers.

Preferably, the surfactant, such as silicone oil, is applied onto or under the transparent or translucent layer containing the platey material. As a result, the platey material is oriented at two or more different angles with respect to the surface of the layer and, thereby, form what appear to be circular and concave shapes, such as swirls or streaking lines in the transparent or translucent layer 16.

The present invention further provides an apparatus for forming a decorative surface covering. The apparatus comprises: (a) a means for casting a fluid transparent or translucent layer containing a platey material; and (b) a means to reorient the platey material to form a distributed pattern of platey material within the fluid transparent or translucent layer. The platey material is reoriented at two or more different angles with respect to the surface of the layer to provide an enhanced three dimensional effect.

Figure 6:
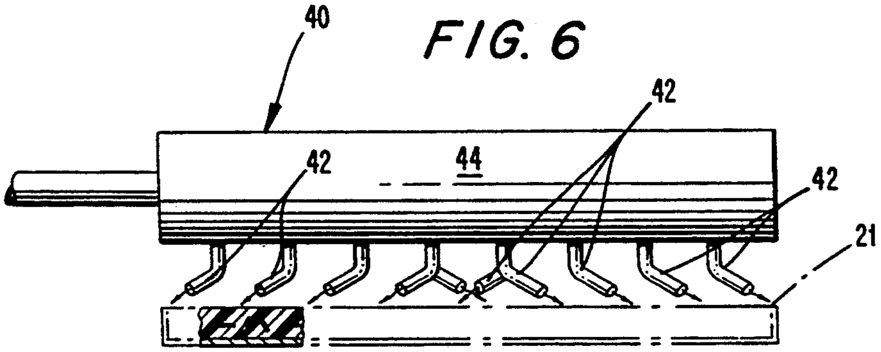
FIG. 6 is a side view of the apparatus of FIG. 5.
Figure 7:
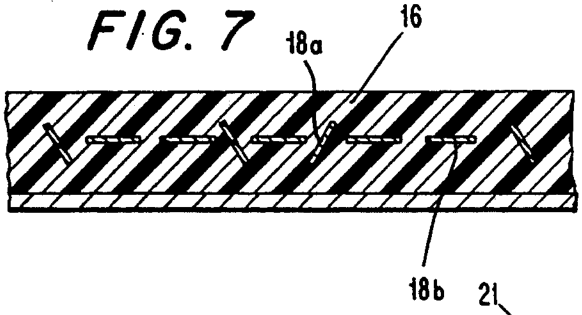
FIG. 7 is an cross-sectional view of the decorative surface covering of the present invention of FIG. 5 taken along line 7—7.

In one embodiment of the present invention, the orienting means is a plurality of nozzles capable of positionally directing the platey material within the transparent or translucent layer. In FIGS. 5-6, an apparatus 40 has a plurality of nozzles 42 that are capable of positionally directing and, hence reorienting, the platey material within the transparent or translucent layer 16. Preferably, the nozzles 42 are divided into various groupings, with each grouping being attached to a manifold 44.

The apparatus 40 can contain one or more manifolds 44, each having a plurality of nozzles 42, to create the desired distribution of the platey material in the transparent or translucent layer. The number of manifolds 44 and the number of nozzles 42 will vary depending upon, in part, the desired size, shape, type and design of the decorative surface covering being formed. Similarly, the operation of the manifolds 44 and nozzles 42 can be altered so that the platey material is reoriented continuously, intermittently, randomly, uniformly, or combination thereof in the transparent or translucent layer.

In such an embodiment, the reorienting means is a jet stream, such as an air stream, emitted from each nozzle that is directed onto the transparent or translucent layer containing the platey material to reorient the platey material at two or more different angles with respect to the surface 21 of the transparent or translucent layer 16. As shown in FIGS. 5-6, the nozzles 42 of each manifold 44 are positioned at various angles with respect to the decorative covering 10 that passes beneath the nozzles 42. As the decorative covering 10 is continuously processed through the apparatus 40, the nozzles 42 reorient the platey material, such as nacreous, pearlescent pigments 18, contained within the decorative covering 10 by emitting a jet stream, such as air or other suitable disturbing media, preferably either a continuous, pulsating, or repeatable jet stream, from each nozzle 42 so that the platey material 18 within the decorative surface covering is disturbed.

After passing underneath the nozzles 42, the platey material 18 comes to rest in the decorative covering at an angle that is different from the angle that the platey material had before the decorative surface covering passed through the apparatus 40. The decorative surface covering containing the disturbed pearlescent pigments can then be set and gelled by various techniques known in the art.

In the embodiment shown in FIGS. 5-6, the desired decorative effect depends, in part, on the number of nozzle 42 installed on each manifold 44, the type of nozzle 42, the size and type of the nozzle orifice, and the processing parameters such as oscillation speed, line speed, and the set up of nozzle angle. These nozzles and processing parameters will now be briefly discussed for the embodiment shown in FIGS. 5-6, but one skilled in the art can readily select other parameters for other apparatus.

To maximize the overall decorative effect, when six manifolds are used, in the first and second manifold the distance between the nozzles is $\frac{3}{4}$", the distance between the nozzles in the third and fourth manifolds is $\frac{7}{8}$", and the distance between nozzles in the fifth and sixth manifold is $2\frac{1}{4}$" to $2\frac{1}{2}$". Preferably, the nozzles installed on the first and second manifolds face the same direction as the web movement. The nozzles on the third and fourth manifolds impinge air at 90 degrees from the web moving direction. The nozzle orifice size used on manifold #1 through #4 is preferably about 62.5 mils. The nozzle orifice size at manifolds #5 and #6 is larger than those on manifolds #1 and #2 due to the requirements of the decorate surface design.

In one embodiment, has been experienced that two different orifice size nozzles should not be mounted on the same manifold due to the unbalancing of air distribution. The large orifice size seems to dominate the air locally, which creates undisturbed plain spots of precoated material under the smaller orifice size nozzles. On the other hand, the use of different orifice size nozzles may result in a different and aesthetically desired effect. These undisturbed plain spots become more severe as the line speed increases.

The design of the nozzle 42 determines, in part, the desired decorative pattern, the spectrum of the covered surface area, and the depth of swirling disturbance. The geometry of the nozzle design influences the volumetric flow and velocity of impinging air.

The impinging force from the nozzles used to disturb the translucent or transparent layer is proportional to the volumetric flow and velocity of the air. For a given nozzle geometry, operations that require high impinging force (at high speed) increase the pressure. Nozzles that cannot have high air pressure, should be shortened in length to increase the volumetric flow. Increasing the nozzle orifice diameter may or may not increase the impinging force, because of the opposite relationship between the orifice diameter and the volumetric flow and velocity of air.

In practical application, the distance of air passage between the nozzle tip to the translucent or transparent layer influences the effective impinging force on the layer. This force is related to the nozzle angle set up. Generally speaking, fan width (swirling pattern) of the decorative surface increases with increasing orifice size, but fan width tends to decrease with increasing line speed. To compensate, a narrower pattern is generated with fast line speed so that a larger orifice size nozzle is used.

The line speed change affects other parameters, such as the air pressure, oscillation speeds, nozzle orifice size and pulsing speeds. An increase in line speed is equivalent to an increase in the shear rate. To keep the same impinging force of air, the force should be increased. Table I lists the suggested air pressure applied at various line speeds.

TABLE I

| | Air Pressure vs. Line Speed | | | | | |
|---|---|---|---|---|---|---|
| | Manifold Air Pressure (psi) | | | | | |
| Line Speed | #1 | #2 | #3 | #4 | #5 | #6 |
| 10 FPM | 30 | 30 | 25 | 25 | 30 | 30 |
| 20 FPM | 30 | 30 | 25 | 25 | 30 | 30 |
| 30 FPM | 35 | 35 | 30 | 30 | 35 | 40 |
| 40 FPM | 40 | 40 | 35 | 35 | 40 | 40 |
| 50 FPM | 45 | 45 | 40 | 40 | 45 | 45 |
| 60 FPM | 50 | 50 | 45 | 45 | 45 | 50 |

The nozzle stroke length allows for the covering of varied impinging areas and a determination of the degree of overlapping pattern. It has been experienced that the longer the stroke length, the greater the impinging area and overlapping pattern decorations design.

The oscillation speed of the nozzles depends in part upon the line speed. Table II describes the successful oscillation speeds for various line speeds. If the oscillation becomes too high, the swirling pattern of the design may become smaller.

TABLE II

| | Oscillation Speed vs. Line Speed | | |
|---|---|---|---|
| | Oscillation Speed (RPM) | | |
| Line Speed | Manifold #1 & #2 | Manifold #3 & #4 | Manifold #5 & #6 |
| 10 | 46 | 66 | 86 |
| 20 | 58 | 88 | 86 |
| 30 | 70 | 88 | 86 |
| 40 | 88 | 96 | 86 |
| 50 | 110 | 96 | 96 |
| 60 | 140 | 126 | 96 |

The density of the pulsing nozzle disturbances on the translucent or transparent layer gradually reduces with increasing line speeds. Table III describes the relationship of pulsing density at varied line speeds.

TABLE III

| | Pulsing Density vs. Line Speeds | | |
|---|---|---|---|
| Line Speed | One Pulsing Cycle | Pattern Repeat Length | Pulsing Density (pulse/lin. inch |
| 10 FPM | 2.4 sec. | 4.8 inch | 3.33 |
| 20 FPM | 2.4 sec. | 9.6 inch | 1.66 |
| 30 FPM | 2.4 sec. | 14.4 inch | 1.11 |
| 40 FPM | 2.4 sec. | 19.2 inch | 0.833 |
| 50 FPM | 2.4 sec. | 24.0 inch | 0.666 |
| 60 FPM | 2.4 sec. | 28.0 inch | 0.555 |

The decorative patterns become smaller as the line speed increases. To change the smaller patterns of air impingement, a larger orifice size nozzle or an increase in the distance between the nozzle tip to the transparent or translucent layer is used. Table IV lists the width of the decorative design with varied line speeds and air pressure for an orifice of 60 mils.

TABLE IV

| Line Speed | Air Pressure | Fan Width at $\frac{1}{2}$" Height | Fan Width at 1" Height |
|---|---|---|---|
| 10 FPM | 30 psi | 0.875" | 1.013" |
| 10 FPM | 40 psi | 1" | 1.025" |
| 10 FPM | 50 psi | 1.05" | 1.038" |
| 10 FPM | 60 psi | 1.025" | 1.05" |
| 30 FPM | 30 psi | 0.6" | 0.7" |
| 30 FPM | 40 psi | 0.8" | 0.7" |
| 30 FPM | 50 psi | 0.775" | 0.925" |
| 30 FPM | 60 psi | 0.95" | 0.95" |
| 60 FPM | 50 psi | 0.6" | 0.675" |

TABLE IV-continued

| Line Speed | Air Pressure | Fan Width at ½" Height | Fan Width at 1" Height |
|---|---|---|---|
| 60 FPM | 60 psi | 0.6" | 0.8" |

Consequently, the fan width of the decorative pattern is influenced by air pressure, line speed, the orifice size of the nozzles, and the height between the nozzle tip and the layer.

The angle of the individual nozzle to the surface layer also determines the visible drag-line defect or the efficiency of the impinging air force. Usually, it is preferred to have a nozzle angle in the ranges of 15°-20°. Angles greater than 20° result in smaller scale pattern, drag-line, and plain spots at a fast line speed, but they have better air efficiency. On the other hand, angles smaller than 15° exhibit good area coverage and good quality of decorative design, but they have poor air efficiency.

Other embodiments of the invention will be apparent to one skilled in the art from consideration of the specification or with practice of the invention disclosed. It is intended that this specification be considered as exemplary only with the true scope and spirit of the invention being indicated by the claims.

What is claimed is:

1. A method of forming a decorative surface covering comprising the steps of:

(a) casting a hardenable, fluid, transparent or translucent layer containing a platey material, which is capable of reflecting and diffracting visible light at various angles as the visible light passes within the transparent or translucent layer; and (b) reorienting the platey material within the transparent or translucent layer at two or more different angles with respect to the surface of the layer under conditions which provide an enhanced three dimensional effect to the decorative surface covering;

wherein in step (b) the platey material is reoriented by positionally directing onto the transparent or translucent layer containing the platey material a plurality of jet streams.

2. The method of claim 1, wherein a first portion of the platey material is oriented substantially vertical to the surface of the layer and a second portion of the platey material is oriented substantially horizontal to the surface of the layer.

3. The method of claim 1, wherein the platey material is randomly distributed in the layer.

4. The method of claim 1, wherein the jet streams are from a plurality of nozzles.

5. The method of claim 1, wherein a portion of the jet streams are pulsating.

6. The method of claim 1, wherein the platey material is continuously distributed within the transparent or translucent layer.

7. The method of claim 1, wherein the platey material is uniformly distributed within the transparent or translucent layer.

8. The method of claim 1, wherein the platey material is intermittently distributed within the transparent or translucent layer.

9. A method of forming a decorative surface covering comprising the steps of:

(a) casting a hardenable, fluid, transparent or translucent layer containing a platey material, which is capable of reflecting and diffracting visible light at various angles as the visible light passe within t he transparent or translucent layer; and (b) reorienting the platey material within the transparent or translucent layer at two or more different angles with respect to the surface of the layer under conditions which provide an enhanced three dimensional effect to the decorative surface covering;

wherein in step (b) the platey material is reoriented by positionally directing onto the transparent or translucent layer containing the platey material a plurality of air streams.

10. A method of forming a decorative surface covering comprising the steps of:

(a) casting a hardenable, fluid, transparent or translucent layer containing a platey material, which is capable of reflecting and diffracting visible light at various angles as the visible light passe within the transparent or translucent layer; and (b) reorienting the platey material within the transparent or translucent layer at two or more different angles with respect to the surface of the layer under conditions which provide an enhanced three dimensional effect to the decorative surface covering;

wherein in step (b) the platey material is reoriented by positionally directing onto the transparent or translucent layer containing the platey material a plurality of gaseous streams.

11. The method of claim 10, wherein the gaseous steams are jet streams.

12. A method of forming a decorative surface covering comprising the steps of:

(a) casting a hardenable, fluid, transparent or translucent layer containing a platey material, which is capable of reflecting and diffracting visible light at various angles as the visible light passe within the transparent or translucent layer; and (b) reorienting the platey material within the transparent or translucent layer at two or more different angles with respect to the surface of the layer under conditions which provide an enhanced three dimensional effect to the decorative surface covering;

wherein in step (b) the platey material is reoriented by applying a surfactant to the transparent or translucent layer containing the platey material in an amount effective to reduce the surface tension of the platey material and positionally directing onto the transparent or translucent layer containing pearlescent pigments a plurality of jet streams.

13. The method of claim 12, wherein the surfactant is a silicone.

* * * * *

UNITED STATES PATENT AND TRADEMARK OFFICE

CERTIFICATE OF CORRECTION

PATENT NO. : 5,338,504

DATED : August 16, 1994

INVENTOR(S) : C. David Wang et al.

It is certified that error appears in the above-indentified patent and that said Letters Patent is hereby corrected as shown below:

Claim 9, column 12, line 9, change "passe" to --passes-- and "t he" to --the--.

Claim 10, column 12, line 26, change "passe" to --passes--.

Claim 12, column 12, line 45, change "passe" to --passes--.

Signed and Sealed this

Eleventh Day of October, 1994

Attest:

BRUCE LEHMAN

Attesting Officer

*Commissioner of Patents and Trademarks*